(12) United States Patent
Arakawa (10) Patent No.: US 11,889,202 B2
(45) Date of Patent: Jan. 30, 2024

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Ryoji Arakawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 17/318,842

(22) Filed: May 12, 2021

(65) Prior Publication Data
US 2021/0360214 A1    Nov. 18, 2021

(30) Foreign Application Priority Data
May 18, 2020    (JP) .................................. 2020-086871

(51) Int. Cl.
*H04N 23/88*  (2023.01)
*H04N 9/64*  (2023.01)
*G06N 20/00*  (2019.01)

(52) U.S. Cl.
CPC ............. *H04N 23/88* (2023.01); *G06N 20/00* (2019.01); *H04N 9/643* (2013.01)

(58) Field of Classification Search
CPC .................................................. H04N 23/617
USPC ....................................................... 348/223.1
See application file for complete search history.

(56) References Cited

U.S. PATENT DOCUMENTS

| 2009/0002519 A1 | 1/2009 | Nakamura |
| 2010/0225780 A1 | 9/2010 | Shimizu |
| 2015/0326842 A1* | 11/2015 | Huai ................. G06T 5/007 |
| | | 348/223.1 |
| 2022/0230323 A1* | 7/2022 | Liba ................. G06T 5/008 |

FOREIGN PATENT DOCUMENTS

| CN | 1885952 A | 12/2006 |
| CN | 101350883 A | 1/2009 |
| CN | 102148933 A | 8/2011 |
| CN | 102769761 A | 11/2012 |
| CN | 105245863 A | 1/2016 |
| CN | 105306916 A | 2/2016 |
| CN | 107682685 A | 2/2018 |
| JP | 2006-319830 A | 11/2006 |
| JP | 2009-159496 A | 7/2009 |

OTHER PUBLICATIONS

Wang et al.; "An automatic white balance method via dark channel prior"; Opto-Electronic Engineering; vol. 45, 1st term, Jan. 2018; Intelligent Equipment Laboratory, Xidian University, Xi'an, Shaanxi 710071, China.
Lin; "An Automatic White Balance Method Based on Edge Detection"; 2006 IEEE International Symposium on Consumer Electronics; Jun. 2006.

* cited by examiner

*Primary Examiner* — Joel W Fosselman
(74) *Attorney, Agent, or Firm* — Canon U.S.A., Inc. IP Division (57) ABSTRACT

An image processing apparatus includes a detection unit configured to detect a specific area from a captured image, and a determination unit configured to determine, based on the detected specific area, a light source color including a characteristic color by using a learning unit trained in advance by machine learning.

11 Claims, 7 Drawing Sheets

IMAGE PROCESSING APPARATUS, IMAGE PROCESSING METHOD, AND STORAGE MEDIUM

BACKGROUND

Field of the Disclosure

The present disclosure relates to a technique for processing a captured image.

Description of the Related Art

In image capturing with a digital camera, white balance (hereinafter abbreviated as WB) processing is generally performed in the camera so that the white color under image capturing illumination has equal red (R), green (G), and blue (B) signal values. Japanese Patent Application Laid-Open No. 2006-319830 discusses a technique for estimating a light source based on an image signal obtained by capturing the white color and adjusting RGB values based on light source parameters corresponding to the estimated light source so that the w % bite color under the illumination becomes achromatic.

In the case of capturing an image of a close-up face of a person, or in the case of taking a group photograph in which many faces are included, a white detection target area may be extremely small, which makes it difficult to perform the WB processing. In this regard, Japanese Patent Application Laid-Open No. 2009-159496 discusses a technique for performing the WB processing based on a skin color area. In the WB processing, it is necessary to identify the type of external factors (e.g., the type of ambient light) that have an effect in a captured scene, and to perform color correction processing corresponding to the identified type of external factors (e.g., the ambient light is sunlight or fluorescent light).

In the technique discussed in Japanese Patent Application Laid-Open No. 2006-319830, the light source is estimated based on the image signal obtained by capturing the white color, and a WB correction corresponding to the estimated light source is adjusted. Accordingly, if a region of achromatic colors is small, the light source cannot be estimated, which makes it difficult to perform an adjustment to obtain an optimum WB.

Further, in the technique discussed in Japanese Patent Application Laid-Open No. 2009-159496, a skin color of each detected face is converted into a target skin color appropriate as the skin color. However, the conversion processing is not performed based on determination of a light source. Thus, for example, if image capturing is performed in an environment where there are many light sources to be estimated, such as outdoors (under sunlight, under a cloudy condition, in the shade, etc.), the WB correction cannot be appropriately performed and the original colors cannot be reproduced in some cases.

SUMMARY

According to embodiments of the present disclosure, an image processing apparatus includes one or more processors configured to function as following units: a detection unit configured to detect a specific area from a captured image, and a determination unit configured to determine, based on the detected specific area, a light source color including a characteristic color by using a learning unit (for example a learning model) trained in advance by machine learning.

Further features of the present disclosure will become apparent from the following description of exemplary embodiments with reference to the attached drawings.

DESCRIPTION OF THE EMBODIMENTS

Exemplary embodiments of the present disclosure will be described below with reference to the drawings. The following exemplary embodiments are not intended to limit the present disclosure, and not all combinations of features described in some embodiments are essential to the present disclosure. The same components are denoted by the same reference numerals in the description.

Figure 1:
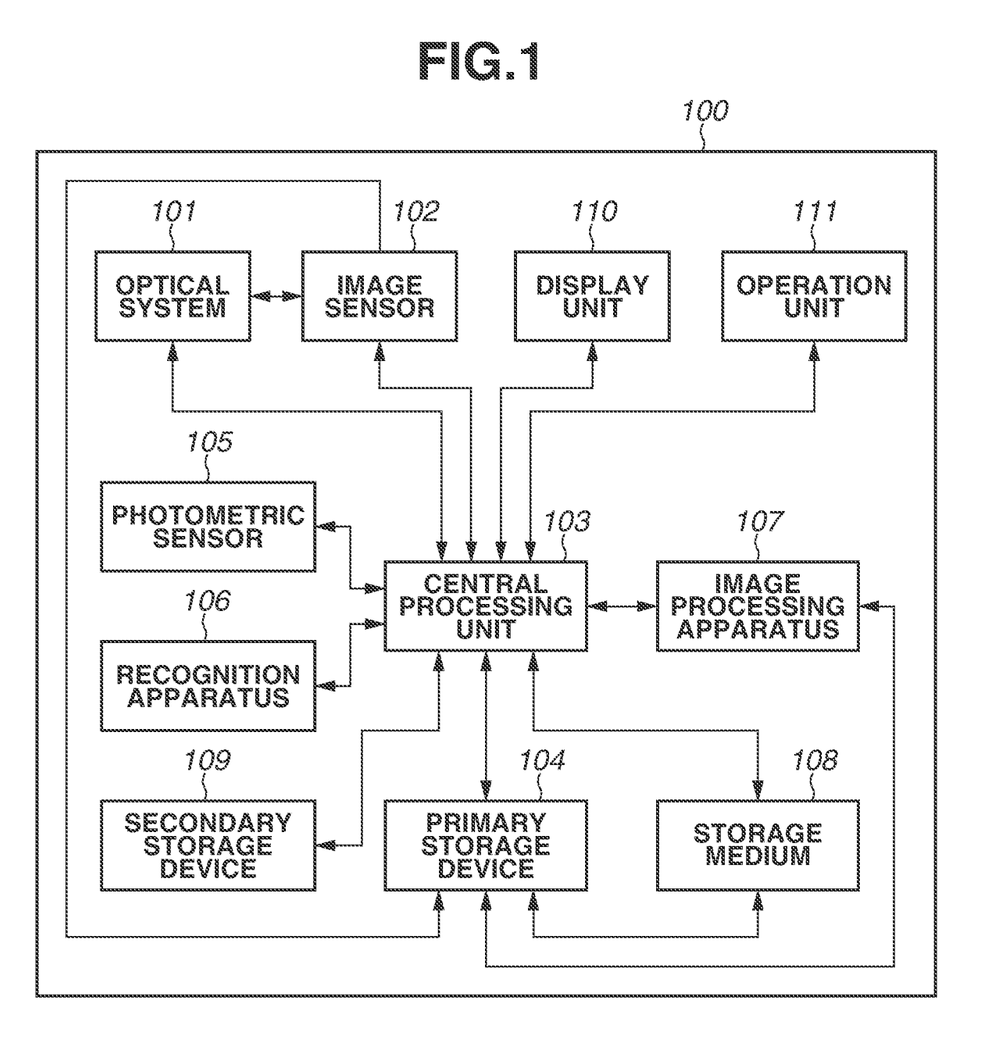
FIG. 1 is a block diagram illustrating a basic configuration of an image capturing apparatus including an image processing apparatus according to an exemplary embodiment.

FIG. 1 is a block diagram schematically illustrating a configuration of an image capturing apparatus 100 as an application example of an image processing apparatus according to the present exemplary embodiment.

The image capturing apparatus 100 is a camera such as a digital camera or a digital video camera. The image capturing apparatus 100 may be any electronic apparatus having a camera function, such as a mobile phone with a camera function or a computer equipped with a camera.

An optical system 101 includes a lens, a shutter, a diaphragm, and the like, and forms an optical image of an object on an imaging plane of an image sensor 102. The optical system 101 transmits information about a focal length, a shutter speed, and an aperture value to a central processing unit (CPU) 103. The image sensor 102 is a charge-coupled device (CCD) image sensor, a complementary metal-oxide semiconductor (CMOS) image sensor, or the like, and includes red (R), green (G), and blue (B) sensor elements, for example, in the Bayer array. The image sensor 102 converts the optical image formed by the optical system 101 into luminance information for each pixel. Digital data obtained via an analog-to-digital (AD) converter (not illustrated), i.e., so-called RAW data before development processing, is stored in a primary storage device 104 via the CPU 103. An electrical gain (hereinafter referred to as International Organization for Standardization (ISO) sensitivity) of the image sensor 102 is set by the CPU 103.

A photometric sensor 105 is divided into a plurality of photometric areas (e.g., 96 areas composed of 12 areas in a horizontal direction by eight areas in a vertical direction), and detects an object luminance for each divided area based on the quantity of light incident from the optical system 101. A luminance signal for each photometric area output from the photometric sensor 105 is converted into a digital signal by the AD converter (not illustrated), and the digital signal is transmitted to the CPU 103. The number of divided areas is not limited to 96 described above, but instead may be any positive number.

The CPU 103 that functions as a control unit controls the units constituting the image capturing apparatus 100 based on input data and a program stored in advance to implement functions of the image capturing apparatus 100. In the following description, at least some of the functions implemented by the CPU 103 executing programs may be implemented by dedicated hardware such as an application specific integrated circuit (ASIC).

The primary storage device 104 is a volatile storage device such as a random access memory (RAM), and is used as a work area for the CPU 103. Information stored in the primary storage device 104 is used by an image processing apparatus 107, or is recorded on a storage medium 108.

A secondary storage device 109 is a nonvolatile storage device such as an electrically erasable programmable read-only memory (EEPROM), and stores a program (firmware) for controlling the image capturing apparatus 100 and various setting information. The program and various setting information stored in the secondary storage device 109 are used by the CPU 103.

The storage medium 108 records, for example, image data that is obtained by capturing an image with the image sensor 102 and is temporarily stored in the primary storage device 104. The storage medium 108 is, for example, a semiconductor memory card. The storage medium 108 is detachable from the image capturing apparatus 100, and the recorded data can be read by another apparatus such as a personal computer. In other words, the image capturing apparatus 100 includes a mechanism for attaching and detaching the storage medium 108 and a read/write function for the storage medium 108.

A display unit 110 displays a viewfinder image during image capturing, a captured image, and a graphical user interface (GUI) image for interactive operation.

An operation unit 111 is an input device group that receives a user operation and transmits operation input information to the CPU 103. Examples of the operation unit 111 include a button, a lever, and a touch panel. The operation unit 111 may include an input device that uses voice or a gaze. A release button for obtaining a user operation to start image capturing in the image capturing apparatus 100 is also included in the operation unit 111. In the image capturing apparatus 100 according to the present exemplary embodiment, the image processing apparatus 107 includes various image processing patterns to be applied to a captured image, and these patterns can be set as image capturing modes from the operation unit 111.

A recognition apparatus 106 detects a specific object area (e.g., an area corresponding to a human face, or an area of sky) from the captured image, and data on the detected area is transmitted to the CPU 103. In the present exemplary embodiment, the recognition apparatus 106 detects the specific object area by using machine learning, a support vector machine (SVM), and the like. However, a method for detecting the specific object area is not limited to machine learning and the SVM.

The image processing apparatus 107 performs various types of image processing on captured image data obtained by capturing an image with the image sensor 102. Examples of the image processing include so-called development processing such as white balance processing, color interpolation processing for converting signals corresponding to the RGB Bayer array into three plane signals for RGB colors, gamma correction processing, saturation correction, and color phase correction. As described in detail below, the image processing apparatus 107 according to the present exemplary embodiment further detects a specific area from the specific object area detected by the recognition apparatus 106, and determines, based on the detected specific area, a light source color including a characteristic color by using a learning unit trained in advance by machine learning. Further, the image processing apparatus 107 performs a white balance correction based on the light source color obtained as a result of determination. For example, if a person is detected as the specific object area, the image processing apparatus 107 further detects a human skin area as a specific area from the area corresponding to the person, estimates (determines) a light source color by using the learning unit based on a signal value corresponding to the human skin area, and performs a white balance correction based on the estimated light source color. At least part of the processing to be performed by the image processing apparatus 107 may be implemented as a software module by the CPU 103 executing a program according to the present exemplary embodiment. White balance is hereinafter abbreviated as WB as needed.

Processing to be performed by the image processing apparatus 107 according to the present exemplary embodiment will be described below. The present exemplary embodiment illustrates processing in which, for example, an image of a person is captured at a location where there is a small number of achromatic objects, such as a lawn area, under natural light (sunlight), and an appropriate white balance correction can be performed on the skin color area of the person in the captured image.

Figure 2:
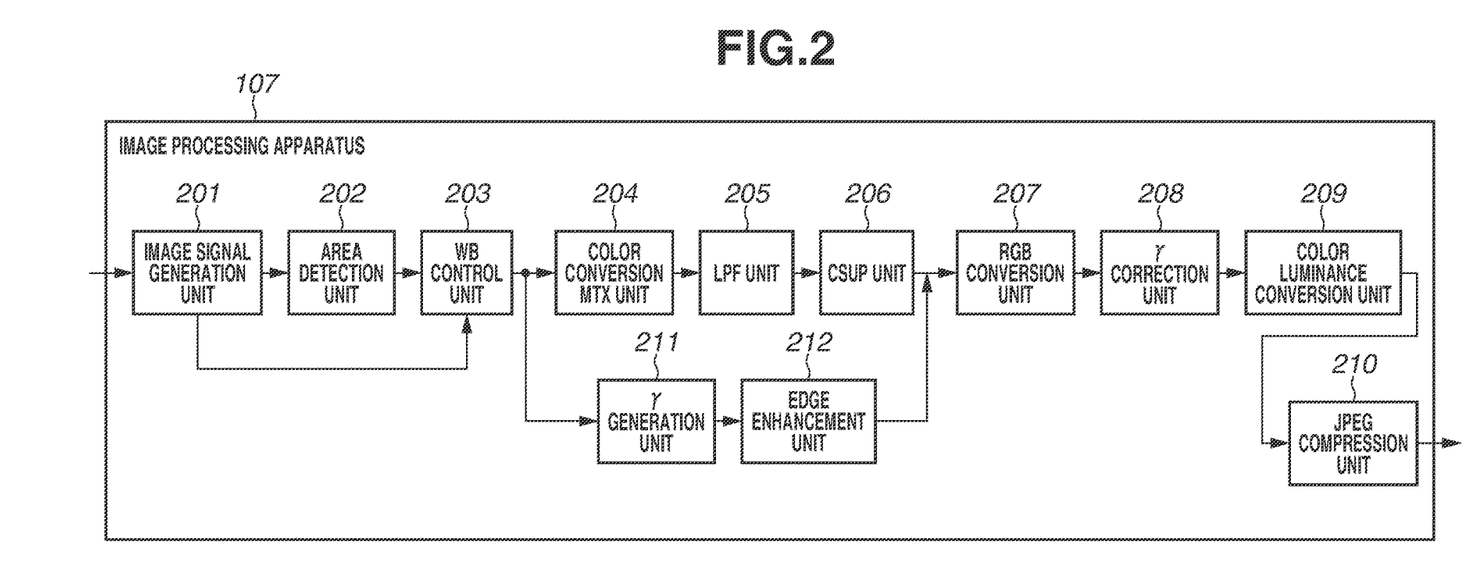
FIG. 2 is a block diagram illustrating a functional configuration of the image processing apparatus.

FIG. 2 is a block diagram illustrating processing of the image processing apparatus 107 as functional blocks. Each processing unit of the image processing apparatus 107 may be implemented by a hardware components such as a circuit, or some or all of the processing units may be implemented by a software module by executing programs according to the present exemplary embodiment.

An image signal generation unit 201 receives image data that is obtained by capturing an image with the image sensor 102 and converting an analog signal into a digital signal by the AD converter (not illustrated). The image signal generation unit 201 performs synchronization processing on the received R, G, and B image data formed in the Bayer array, thereby generating image data including RGB colors in each pixel. Further, the image signal generation unit 201 outputs the generated image data to each of an area detection unit 202 and a WB control unit 203.

The area detection unit 202 detects a skin color area from an area corresponding to a person detected as the specific object area by the recognition apparatus 106.

The WB control unit 203 calculates a WB correction value based on the image data output from the image signal generation unit 201 and information about the skin color area detected by the area detection unit 202. Then, the WB control unit 203 performs white balance correction processing on the image data by using the calculated WB correction value. WB correction value calculation processing to be performed by the WB control unit 203 will be described in detail below.

A color conversion matrix (MTX) unit 204 multiplies a color gain so that the image data on which WB correction processing is performed by the WB control unit 203 can be reproduced with an optimum color, and converts the image data into two pieces of color-difference data R-Y and B-Y.

A low-pass filter (LPF) unit 205 limits a bandwidth of the color-difference data R-Y and B-Y output from the color conversion MTX unit 204.

A chroma suppress (CSUP) unit 206 suppresses a false color component in a saturated part of the color-difference data R-Y and B-Y obtained after the bandwidth is limited by the LPF unit 205.

A Y generation unit 211 generates luminance data Y from the image data on which the WB correction processing is performed by the WB control unit 203.

An edge enhancement unit 212 generates edge-enhanced luminance data Y from the luminance data Y generated by the Y generation unit 211.

An RGB conversion unit 207 generates RGB data from the color-difference data R-Y and B-Y output from the CSUP unit 206 and the luminance data Y output from the edge enhancement unit 212.

A gamma (γ) correction unit 208 applies a gradation correction based on predetermined γ characteristics to the RGB data output from the RGB conversion unit 207.

A color luminance conversion unit 209 converts the RGB data subjected to the gamma correction into YUV data.

A Joint Photographic Experts Group (JPEG) compression unit 210 performs compression coding on the YUV data output from the color luminance conversion unit 209. The image data subjected to the compression coding is recorded on the storage medium 108 as an image data file.

Next, the WB correction value calculation processing to be performed by the WB control unit 203 will be described in detail.

First, the WB control unit 203 performs block division processing of dividing an image into a plurality of blocks in the horizontal and vertical directions on the image data output from the image signal generation unit 201. In the block division processing, for example, the image is divided into 96 blocks composed of 12 blocks in the horizontal direction by eight blocks in the vertical direction. The number of divided blocks is not limited to 96, but instead may be any positive number. Then, the WB control unit 203 calculates R, G, and B integral values within a block for each block, and calculates an R/G value and a B/G value based on the R, G, and B integral values.

Figure 3A:
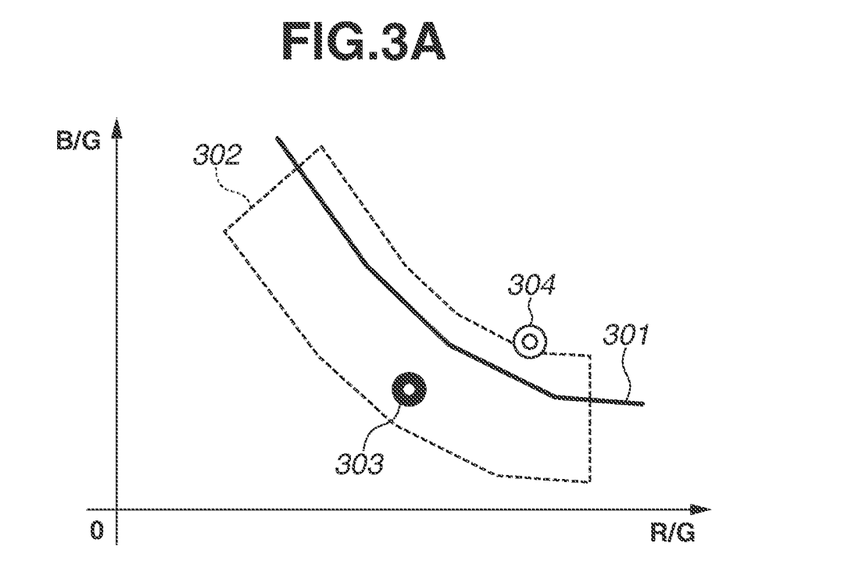
FIGS. 3A and 3B are graphs used to explain white balance (WB) correction value calculation processing.

Further, the WB control unit 203 integrates R, G, and B values in each block included in a white area 302 set on an R/G axis and a B/G axis as illustrated in FIG. 3A, thereby obtaining integrated R, G, and B values of Rinteg, Ginteg, and Ginteg.

Figure 3B:
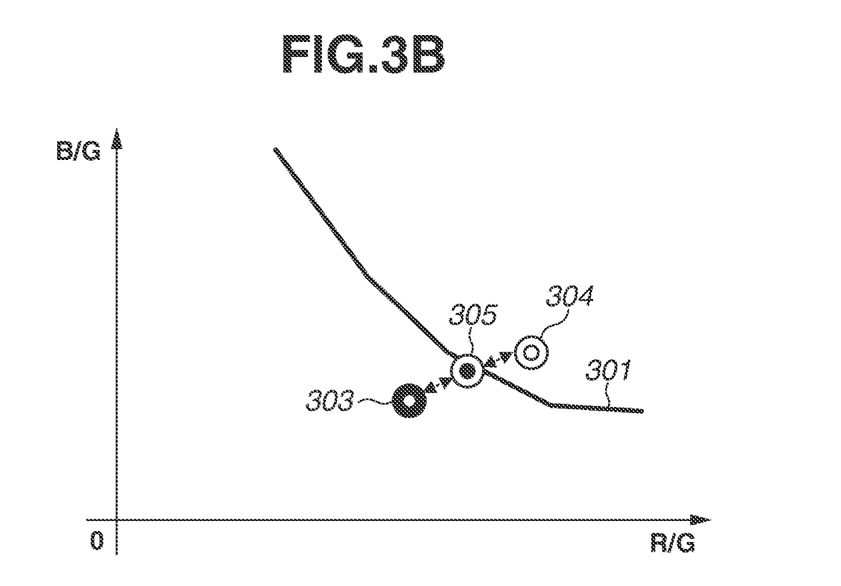

In FIG. 3A, a solid line represents a blackbody radiation locus 301. The white area 302 is set so that the R/G value and the B/G value can be plotted within an area indicated by a dashed line in FIG. 3A when the image capturing apparatus 100 captures an image of an achromatic object under various types of light sources, for example, in the sun, in the shade, and under light-emitting diode (LED) light, tungsten light, mercury light, fluorescent light, and flash light. A circle 303 illustrated in FIGS. 3A and 3B represents a location where a single integrated value is converted into coordinates corresponding to the R/G axis and the B/G axis. The present exemplary embodiment describes an example where pixels that are likely to have an achromatic color are extracted from an area of the object by using the R/G axis and the B/G axis and the light source color is estimated to thereby perform WB calculation processing. However, the pixels that are likely to have an achromatic color may be extracted from the area of the object and the WB calculation processing may be performed by a method other than the above-described method.

A circle 304 illustrated in FIG. 3A represents a result of estimating the light source color (correlated color temperature) by using the learning unit trained in advance from a signal value in the skin color area detected by the area detection unit 202 and calculating the WB correction value based on the correlated color temperature, on the R/G axis and the B/G axis. In the present exemplary embodiment, training data for the learning unit used to estimate the light source color (correlated color temperature) is data having a correlation between the light source in which a color distribution is preliminarily distributed at a specific distance from the blackbody radiation locus and the object having a characteristic color.

Further, in the present exemplary embodiment, a signal value subjected to conversion processing for reducing an individual difference of, for example, the image sensor 102 of the image capturing apparatus 100 is used as a signal value to be input to the learning unit. This makes it possible to use the learning unit for general purposes without the need for preparing the learning unit for each unit, and to suppress variation in estimation accuracy due to individual variations.

Figure 4:
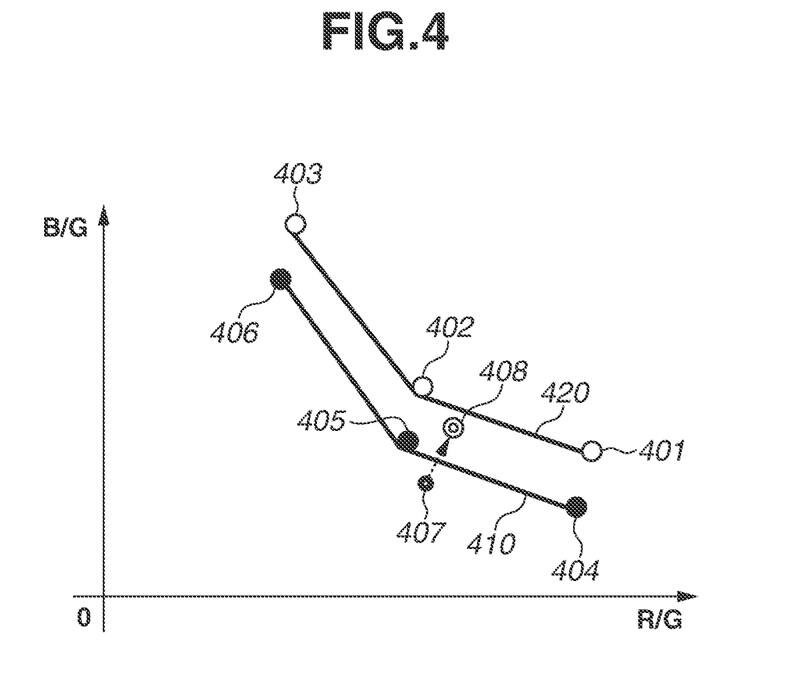
FIG. 4 is a graph used to explain a relationship between individual differences of signal values.

The following equations (1) and (2) are conversion equations expressing conversion processing to reduce the individual difference, and are conversion equations from an adjust space with an individual difference into a reference space with no individual difference. FIG. 4 is a graph illustrating a relationship between the adjust space and the reference space. A solid line 420 illustrated in FIG. 4 represents a relationship between RGB values of different types of light sources, i.e., a light source A, a light source B, and a light source C, in the reference space. A solid line 410 represents a relationship between RGB values of the light source A, the light source B, and the light source C in the adjust space.

In FIG. 4, a circle 401 represents RGB values (RrefA, GrefA, BrefA) of the light source A in the reference space. A circle 402 represents RGB values (RrefB, GrefB, BrefB) of the light source B in the reference space. A circle 403 represents RGB values (RrefC, Greft, BrefC) of the light source C in the reference space. In FIG. 4, a circle 404 represents RGB values (RadjA, GadjA, BadjA) of the light source A in the adjust space. A circle 405 represents RGB values (RadjB, GadjB, BadjB) of the light source B in the adjust space. A circle 406 represents RGB values (RadjC, GadjC, BadjC) of the light source C in the adjust space.

The RGB values of the light source A, the light source B, and the light source C in each of the reference space and the adjust space are measured in advance. Specifically, the light source A, the light source B, and the light source C are a plurality of light sources of which the R, G, and B values corresponding to the reference space with no individual difference and the R, G, and B values corresponding to the adjust space with an individual difference are known.

In this case, the WB control unit 203 forms two straight lines by performing linear interpolation between two light sources determined, from among the plurality of known light sources, for each space based on the R, G. and B values for the specific area in the captured image. Then, the WB control unit 203 performs conversion processing of converting R, G, and B values for the specific area in the captured image corresponding to the coordinates of the adjust space into R, G. and B values corresponding to the coordinates of the reference space based on a distance between the two straight lines.

More specifically, in the present exemplary embodiment, the WB control unit 203 determines that RGB values (Ri, Gi, Bi) of the signal value obtained from the skin color area are located closer to which one of the light source A, the light source B, and the light source C. In the example illustrated in FIG. 4, a case is cited where the coordinates of the RGB values (Ri, Gi, Bi) of the signal value obtained from the skin color area correspond to the coordinates in the adjust space indicated by a circle 407 illustrated in FIG. 4. Further, the WB control unit 203 determines if the Bi value in the RGB values (Ri, Gi, Bi) of the signal value obtained from the skin color area are located closer to the light source A than the light source B, or is located closer to the light source C. In the example illustrated in FIG. 4, the Bi value in the RGB values (Ri, Gi, Bi) of the signal value obtained from the skin color area are located closer to the light source A than the light source B. Accordingly, the WB control unit 203 performs the linear interpolation between the coordinates corresponding to the RGB values of the two light sources, i.e., the light source B and the light source A. Then, the WB control unit 203 converts the RGB values (Ri, Gi, Bi) of the signal value obtained from the skin color area from coordinate values in the adjust space into coordinate values in the reference space based on the distance between the two straight lines obtained by the linear interpolation in each of the reference space and the adjust space. In the example illustrated in FIG. 4, the coordinates of the RGB values (Ri, Gi, Bi) of the signal value obtained from the skin color area correspond to the coordinates in the adjust space indicated by the circle 407 illustrated in FIG. 4. Accordingly, the WB control unit 203 converts the coordinate values in the adjust space into coordinate values in the reference space indicated by a circle 408 illustrated in FIG. 4.

When the Ri value satisfies RadjB<Ri $$R=(RrefA-RrefB)/(RadjA-RadjB)*(Ri-RadjB)+RrefB$$

$$B=(BrefA-BrefB)/(BadjA-BadjB)*(Bi-BadjB)+BrefB \quad (1)$$

When the Ri value satisfies RadjB>Ri $$R=(RrefB-RrefC)/(RadjB-RadjC)*(Ri-RadjC)+RrefC$$

$$B=(BrefB-BrefC)/(BadjB-BadjC)*(Bi-BadjC)+BrefC \quad (2)$$

Figure 5A:
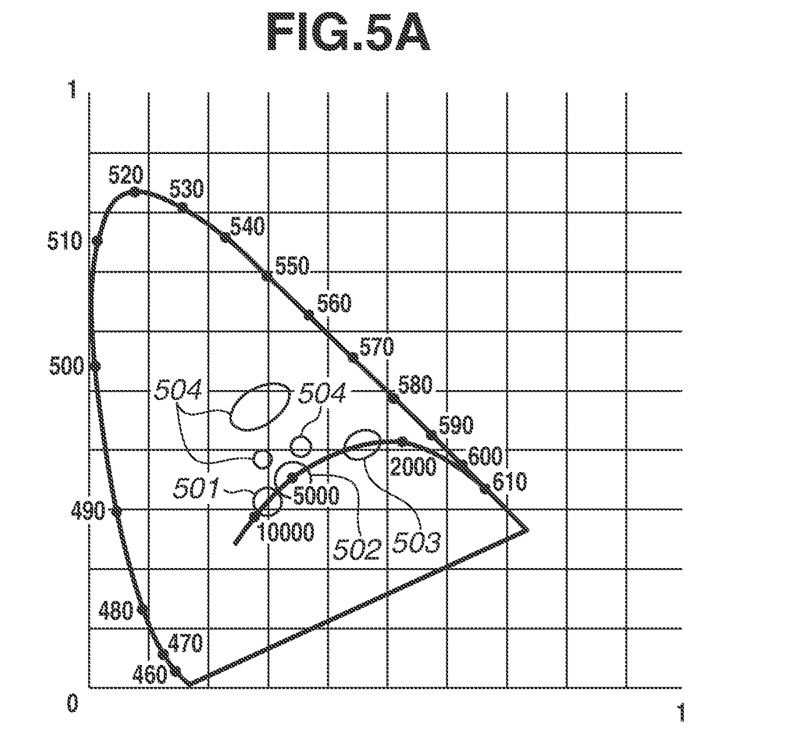
FIGS. 5A and 5B each illustrate a relationship between a blackbody radiation locus and light sources on an XY chromaticity diagram.
Figure 5B:
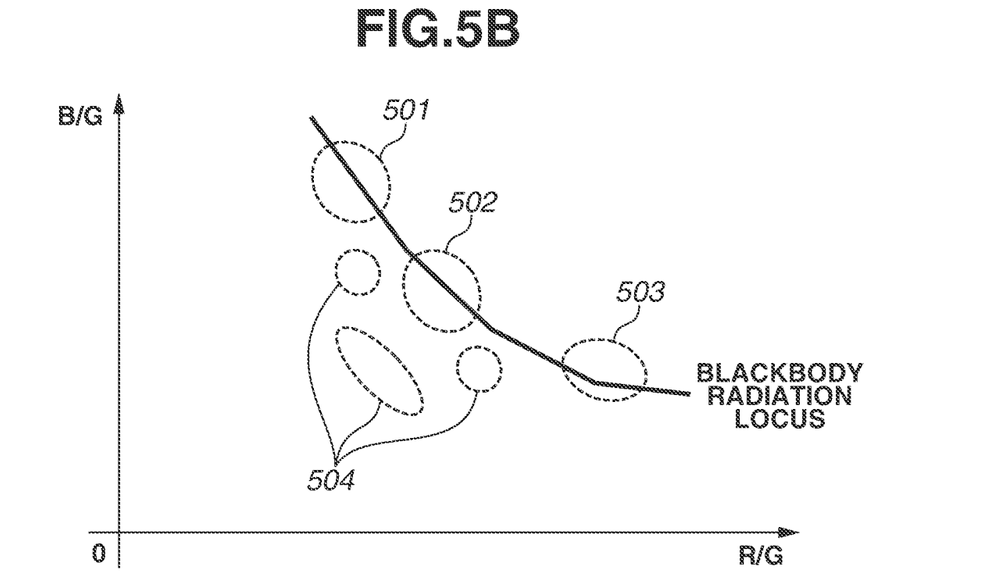

In the present exemplary embodiment, as described above, the estimated light source color (correlated color temperature) is obtained from the learning unit having correlation characteristics between the human skin area and natural light and artificial light sources distributed in advance at a specific distance from the blackbody radiation locus. FIG. 5A illustrates a relationship between the blackbody radiation locus and light sources on an XY chromaticity diagram. FIG. 5B is a graph illustrating the relationship between the blackbody radiation locus and light sources that is converted into values on the R/G axis and the B/G axis. A color distribution of the natural light source is distributed on the blackbody radiation locus while that of the artificial light sources (fluorescent light, LED light source, etc.) is distributed at a specific distance from the blackbody radiation locus. In FIGS. 5A and 5B, an area 501 represents a distribution in the shade, an area 502 represents a distribution under a cloudy condition, an area 503 represents a distribution under sunlight, and each area 504 represents a distribution under a light bulb.

In the case of calculating the WB correction value based on the estimated light source color (correlated color temperature), conversion from the reference space into the adjust space is necessary, so that an inverse conversion of the above-described conversion method is performed to calculate point coordinates (RSg, BSg) corresponding to a color temperature on the blackbody radiation locus. Then, the WB control unit 203 calculates a first WB correction value from the estimated light source color (correlated color temperature) by the following equation (3). In the present exemplary embodiment, the WB correction value calculated from the estimated light source color (correlated color temperature) is used as the first WB correction value. WRgain in the equation (3) represents the R gain of the first WB correction value calculated from the estimated light source color. Similarly, in the equation (3), WGgain represents the G gain of the first WB correction value, and WBgain represents the B gain of the first WB correction value.

$$WRgain=1/RSg$$

$$WGgain=1$$

$$WBgain=1/BSg \quad (3)$$

Further, in the present exemplary embodiment, the WB control unit 203 calculates the WB correction value corresponding to the light source color estimated based on a color of an area including an area other than the specific area. i.e., an area including an area other than the specific object area. In the present exemplary embodiment, the WB correction value calculated based on the light source color estimated based on the color of the area including the area other than the specific area is used as a second WB correction value. Further, the WB control unit 203 calculates coordinates of a point corresponding to a color temperature of the second WB correction value on the blackbody radiation locus (e.g., coordinates indicated by the circle 303 illustrated in FIG. 3B). Then, the WB control unit 203 calculates coordinates of a third WB correction value obtained by mixing the first WB correction value (e.g., indicated by the circle 304 illustrated in FIG. 3B) based on the estimated light source color and the second WB correction value (indicated by the circle 303 illustrated in FIG. 3B) based thereon at a mixing ratio corresponding to the color temperature on the blackbody radiation locus. A circle 305 illustrated in FIG. 3B represents coordinates of the third WB correction value on the horizontal axis R/G and the vertical axis B/G in a simplified manner.

Figure 6:
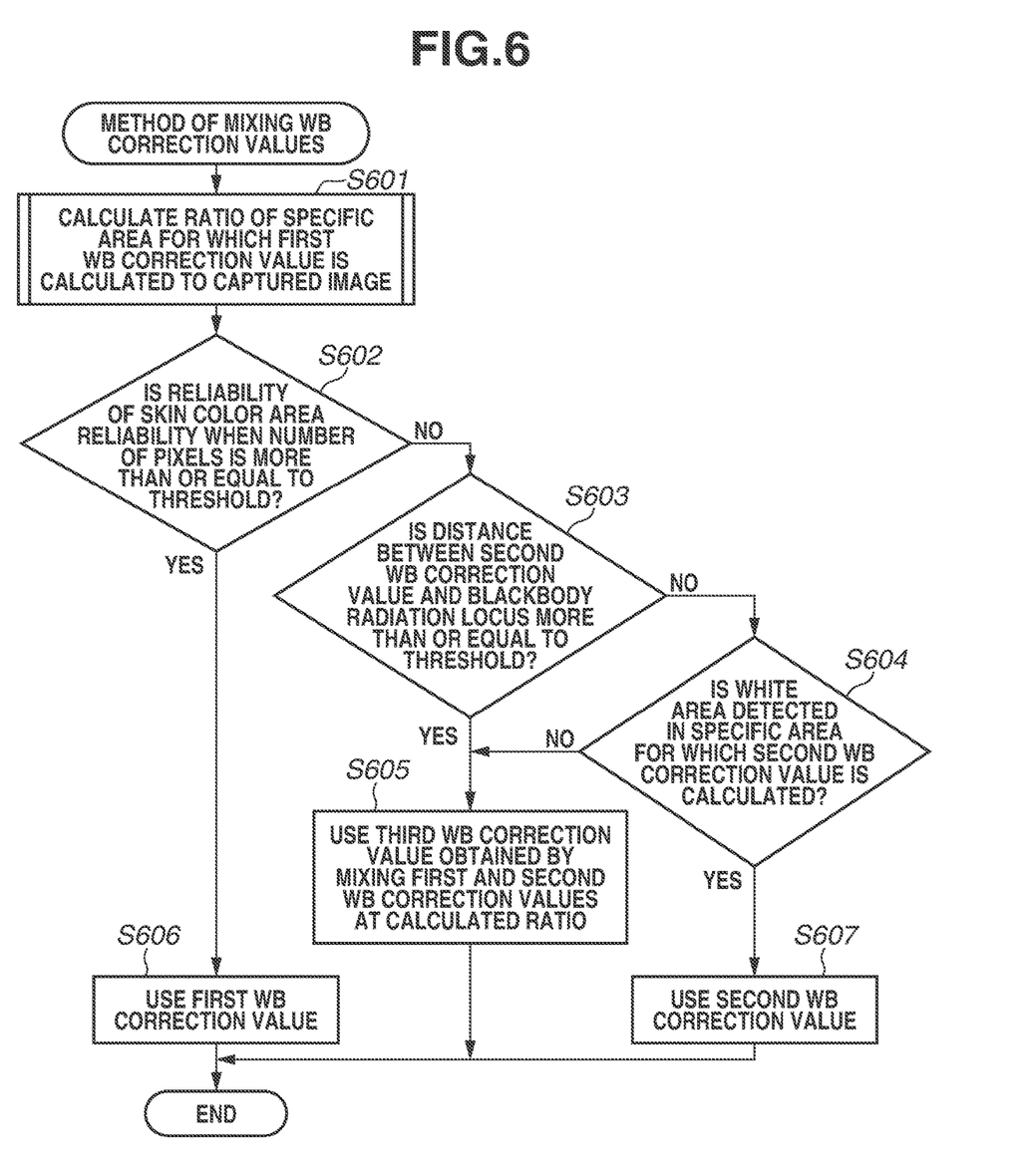
FIG. 6 is a flowchart illustrating processing for determining a WB correction value to be used.

Third WB correction value generation processing to be executed by the WB control unit 203 by mixing the first WB correction value and the second WB correction value, and processing of determining the WB correction values to be used for white balance correction will be described below with reference to the flowchart illustrated in FIG. 6.

In step S601, the WB control unit 203 calculates reliability of the specific area based on a ratio of the specific area to the captured image. Specifically, the WB control unit 203 calculates reliability of the skin color area based on a ratio of the skin color area detected by the area detection unit 202 to the entire captured image.

Figure 7A:
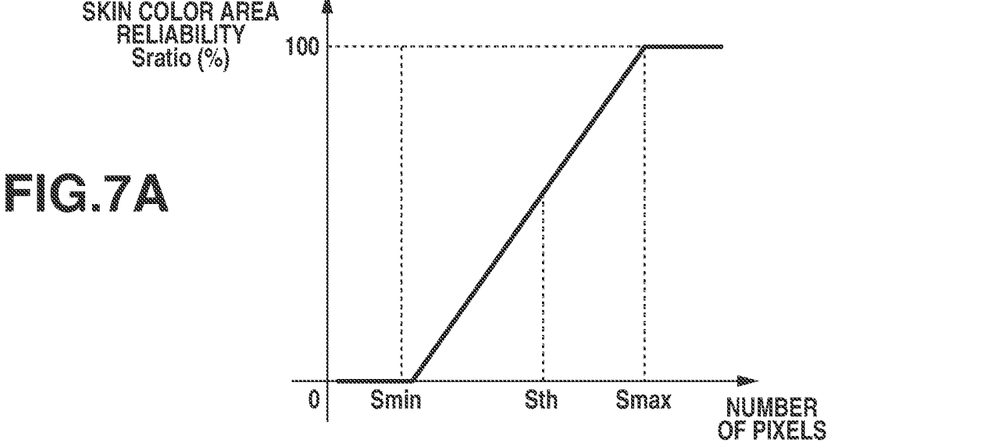
FIGS. 7A, 7B, and 7C are graphs illustrating various types of reliability tables to be used during mixing.

FIG. 7A is a graph illustrating a table used to calculate the reliability of the skin color area. In FIG. 7A, the horizontal axis represents the number of pixels detected as the skin color area, and the vertical axis represents reliability Sratio of the skin color area. In the present exemplary embodiment, a minimum value Smin, a threshold Sth, and a maximum value Smax on the horizontal axis can be freely set. Since the number of pixels in the entire captured image is known, the ratio of the skin color area to the entire captured image can be obtained based on the number of pixels detected as the skin color area. Accordingly, the minimum value Smin, the threshold Sth, and the maximum value Smax on the horizontal axis may be set to values at which the reliability Sratio increases as the number of pixels detected as the skin color area increases.

In the present exemplary embodiment, the WB control unit 203 acquires the reliability Sratio of the skin color area based on the number of pixels in the skin color area (the number of pixels in the specific area) with reference to the table illustrated in FIG. 7A. In step S602, the WB control unit 203 determines whether the reliability Sratio of the skin color area corresponds to reliability obtained when the number of pixels in the skin color area is more than or equal to the threshold (more than or equal to the threshold Sth), i.e., whether the ratio of the skin color area to the entire image is sufficiently large. In the skin color area with the reliability Sratio obtained when the number of pixels in the skin color area is more than or equal to the threshold (more than or equal to the threshold Sth), it is considered that the reliability of the light source color estimated based on the color of the skin color area is high and the first WB correction value calculated based on the light source color is the WB correction value with which an appropriate WB correction can be performed. If the WB control unit 203 determines that the number of pixels in the skin color area is more than or equal to the threshold (more than or equal to the threshold Sth) and the reliability of the skin color area is high (YES in step S602), the processing proceeds to step S606. On the other hand, if the WB control unit 203 determines that the number of pixels in the skin color area is less than the threshold Sth and the reliability of the skin color area is not high (NO in step S602), the processing proceeds to step S603.

In step S606, the first WB correction value calculated based on the light source color estimated based on the color of the skin color area, i.e., the light source color with a high reliability, is set to be used for a WB correction.

In step S603, the WB control unit 203 calculates a distance between the blackbody radiation locus and coordinates corresponding to the second WB correction value corresponding to the light source color estimated based on the color of the area including the area other than the specific area. Then, the WB control unit 203 obtains reliability Tdist of the distance with reference to the table illustrated in FIG. 7B.

Figure 7B:
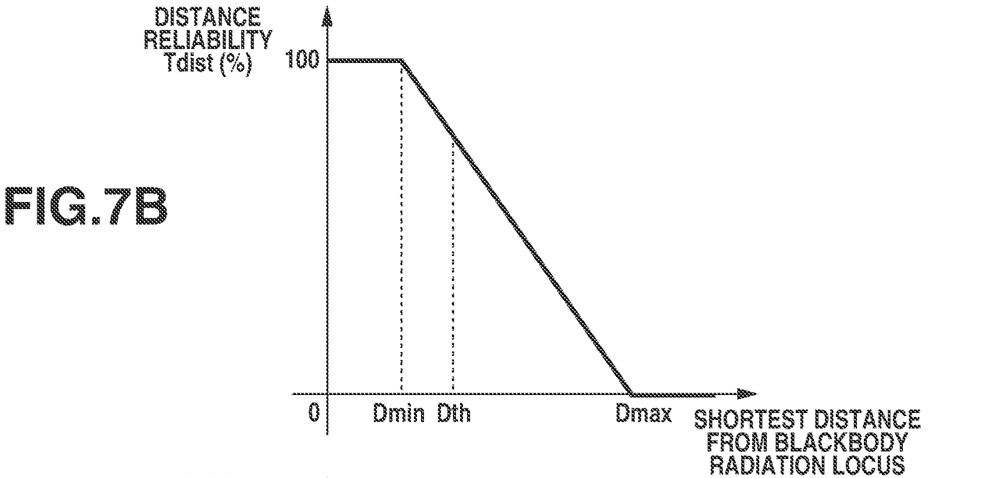

In FIG. 7B, the horizontal axis represents a shortest distance between the blackbody radiation locus and the coordinates corresponding to the second WB correction value, and the vertical axis represents the reliability Tdist of the distance between the blackbody radiation locus and the coordinates corresponding to the second WB correction value. Further, the WB control unit 203 determines whether the distance is more than or equal to a threshold (more than or equal to a threshold Dth). If the WB control unit 203 determines that the distance is less than the threshold (NO in step S603), the reliability Tdist of the distance is high, and thus the processing proceeds to step S604. On the other hand, if the WB control unit 203 determines that the distance is more than or equal to the threshold (YES in step S603), the reliability Tdist of the distance is low, and thus the processing proceeds to step S605. In other words, the WB control unit 203 determines the reliability of the light source color based on a white area by using the reliability Tdist of the distance. If the reliability of the light source color is high, the processing proceeds to step S604. On the other hand, if the reliability is low, the processing proceeds to step S605.

If the WB control unit 203 determines that the distance between the blackbody radiation locus and the coordinates corresponding to the second WB correction value is more than or equal to the threshold Dth and the processing proceeds to step S605, there is a possibility that the processing has been performed outdoors, and thus it may be difficult to estimate the light source. Accordingly, a third WB correction value Wc is calculated by using the following equation (4). In the equation (4), W304 represents the first WB correction value and W303 represents the second WB correction value. The equation (4) is an arithmetic equation for mixing the first WB correction value and the second WB correction value at a mixing ratio based on the reliability Tdist of the distance. Since the reliability Tdist of the distance is the reliability of the distance between the blackbody radiation locus and the coordinates corresponding to the second WB correction value, it can be said that the mixing ratio based on the reliability Tdist of the distance is a mixing ratio based on the reliability of the light source color estimated based on the color of the area including the area other than the specific area.

$$Wc = W304*(1 - Tdist/100) + W303*Tdist/100 \quad (4)$$

Figure 7C:
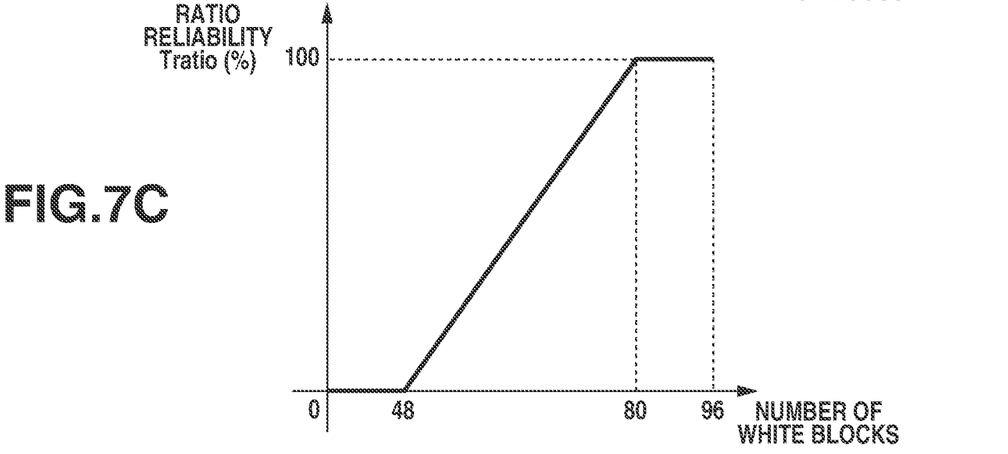

The WB control unit 203 calculates reliability of a ratio of a white area illustrated in FIG. 7C during block division. In step S604, the WB control unit 203 calculates reliability Tratio of the ratio of the white area based on information indicating a ratio of blocks corresponding to the white area to the entire image with reference to the table illustrated in FIG. 7C.

In FIG. 7C, the horizontal axis represents the number of blocks in the extracted white area, and the vertical axis represents the reliability Tratio of the ratio. In the present exemplary embodiment, a block area is divided into 96 blocks composed of 12 blocks in the horizontal direction by eight blocks in the vertical direction. Values on the horizontal axis illustrated in FIG. 7C are merely examples, and are not limited to these values. In other words, the values may be set so that the reliability Tratio of the ratio increases as the ratio of blocks in the white area increases.

In step S604, the WB control unit 203 determines whether the white area is detected in the area including the specific object area when the second WB correction value is calculated. If the WB control unit 203 determines that the white area is detected (YES in step S604), the processing proceeds to step S607. In step S607, the second WB correction value is used for the WB correction. On the other hand, if the WB control unit 203 determines that the white area is not detected (NO in step S604), the processing proceeds to step S605.

If the processing proceeds to step S605 from step S604, the WB control unit 203 determines that there is a possibility that the light source estimation accuracy is low, and thus determines that the second WB correction value is not calculated as an optimum WB correction value. In step S605, the WB control unit 203 calculates the third WB correction value Wc by mixing the first WB correction value and the second WB correction value by an equation (5). In the equation (5), W304 represents the first WB correction value and W303 represents the second WB correction value. The equation (5) is an arithmetic equation for mixing the first WB correction value and the second WB correction value at a mixing ratio based on the reliability Tratio of the ratio.

$$Wc = W304*(1 - Tratio/100) + W303*Tratio/100 \quad (5)$$

As described above, the WB control unit 203 according to the present exemplary embodiment detects the specific area including a characteristic color from a captured image, estimates a light source color based on the characteristic color of the specific area by using the learning unit trained by machine learning, and calculates the first WB correction value. Further, the WB control unit 203 calculates the second WB correction value based on the light source color estimated from a white area in an area including an area other than the specific area. Further, in the present exemplary embodiment, the third WB correction value is calculated by mixing the first WB correction value and the second WB correction value at a mixing ratio based on the reliability of the estimated light source color. Then, the WB control unit 203 determines which one of the first to third WB correction values is to be used for the WB correction processing based on the reliability of the specific area, the reliability of the white area, and information indicating whether the white area is detected. With this configuration, the image processing apparatus 107 according to the present exemplary embodiment can implement an optimum WB correction in which the effect of ambient light is reduced. The image processing apparatus 107 according to the present exemplary embodiment can implement optimum WB correction processing by estimating a light source based on a skin area or the like in which a hue difference is distributed in a certain range regardless of race in a case where a person, which is likely to be a main object in image capturing, is present.

While the present exemplary embodiment illustrates an example where a human skin area is detected as a specific area, any area such as an area corresponding to a green plant may be detected as the specific area.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-086871, filed May 18, 2020, which is hereby incorporated by reference herein in its entirety.

What is claimed is:

1. An image processing apparatus comprising:
one or more processors configured to function as following units:
a detection unit configured to detect a specific area from a captured image;
a first determination unit configured to determine, based on a color included in the detected specific area, a light source color including a characteristic color by using a learning unit trained in advance by machine learning;
a first calculation unit configured to calculate a first white balance correction value corresponding to the light source color determined by the first determination unit;
a second determination unit configured to determine the light source color based on a color of an area including an area other than the specific area;
a second calculation unit configured to calculate a second white balance correction value corresponding to the light source color determined by the second determination unit; and
a third calculation unit configured to calculate a third white balance correction value based on the first white balance correction value and the second white balance correction value.

2. The image processing apparatus according to claim 1, wherein the one or more processors are further configured to function as a correction unit configured to perform a white balance correction on the captured image based on the third white balance correction value.

3. The image processing apparatus according to claim 1, wherein the second calculation unit calculates the second white balance correction value corresponding to the light source color determined based on a color of a white area.

4. The image processing apparatus according to claim 1, wherein the third calculation unit generates the third white balance correction value by mixing the first white balance correction value and the second white balance correction value at a mixing ratio based on reliability of the determined light source color.

5. The image processing apparatus according to claim 1, wherein the specific area is an area including the characteristic color, corresponding to a known object, and having a characteristic color distribution.

6. The image processing apparatus according to claim 5, wherein the characteristic color is a human skin color.

7. The image processing apparatus according to claim 1, wherein learning data for the learning unit is data having a correlation between a light source having a color distribution preliminarily distributed at a specific distance from a blackbody radiation locus and an object having the characteristic color.

8. The image processing apparatus according to claim 1, wherein the one or more processors are further configured to function as a processing unit configured to perform conversion processing to reduce an effect of an individual difference of an image capturing apparatus configured to capture an image, and
wherein a signal value to be input to the learning unit is a signal value subjected to the conversion processing.

9. The image processing apparatus according to claim 8, wherein the processing unit converts red (R), green (G), and blue (B) values for the specific area corresponding to coordinates of a space with the individual difference into R, G, and B values corresponding to coordinates of a space without the individual difference based on a distance between two straight lines obtained by performing linear interpolation between two light sources determined for each of the spaces based on the R, G, and B values for the specific area, from among a plurality of light sources of which the R, G, and B values corresponding to the space without the individual difference and the R, G, and B values corresponding to the space with the individual difference are known.

10. An image processing method comprising:
   detecting a specific area from a captured image;
   determining, in a first determination based on a color included in the detected specific area, a light source color including a characteristic color by using a learning unit trained in advance by machine learning;
   calculating a first white balance correction value corresponding to the light source color determined in the first determination;
   determining, in a second determination, the light source color based on a color of an area including an area other than the specific area;
   calculating a second white balance correction value corresponding to the light source color determined in the second determination; and
   calculating a third white balance correction value based on the first white balance correction value and the second white balance correction value.

11. A non-transitory computer-readable storage medium storing a program for causing a computer to execute an image processing method comprising:
   detecting a specific area from a captured image;
   determining, in a first determination based on a color included in the detected specific area, a light source color including a characteristic color by using a learning unit trained in advance by machine learning;
   calculating a first white balance correction value corresponding to the light source color determined in the first determination;
   determining, in a second determination, the light source color based on a color of an area including an area other than the specific area;
   calculating a second white balance correction value corresponding to the light source color determined in the second determination; and
   calculating a third white balance correction value based on the first white balance correction value and the second white balance correction value.

* * * * *